United States Patent
Li et al.

(10) Patent No.: US 11,297,542 B2
(45) Date of Patent: Apr. 5, 2022

(54) BASE STATION HANDOVER METHOD, SYSTEM, AND COMPUTER STORAGE MEDIUM

(71) Applicant: ZTE CORPORATION, Guangdong (CN)

(72) Inventors: Zhendong Li, Guangdong (CN); Jinguo Zhu, Guangdong (CN); Shuang Liang, Guangdong (CN); Xiaoyun Zhou, Guangdong (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 21 days.

(21) Appl. No.: 16/484,411

(22) PCT Filed: Mar. 22, 2018

(86) PCT No.: PCT/CN2018/080066
§ 371 (c)(1),
(2) Date: Aug. 7, 2019

(87) PCT Pub. No.: WO2018/145670
PCT Pub. Date: Aug. 16, 2018

(65) Prior Publication Data
US 2020/0008109 A1 Jan. 2, 2020

(30) Foreign Application Priority Data

Feb. 7, 2017 (CN) .......................... 201710067392.7

(51) Int. Cl.
*H04W 36/00* (2009.01)
*H04W 76/12* (2018.01)
(Continued)

(52) U.S. Cl.
CPC ......... *H04W 36/0016* (2013.01); *H04W 8/08* (2013.01); *H04W 36/30* (2013.01); *H04W 76/12* (2018.02); *H04W 80/10* (2013.01)

(58) Field of Classification Search
CPC ....... H04W 36/00; H04W 76/12; H04W 8/08; H04W 80/10; H04W 76/11;
(Continued)

(56) References Cited

U.S. PATENT DOCUMENTS

2016/0205606 A1 7/2016 Park et al.
2017/0339609 A1* 11/2017 Youn ..................... H04W 76/11
(Continued)

FOREIGN PATENT DOCUMENTS

CN 101064943 A 10/2007
CN 101374325 A 2/2009

OTHER PUBLICATIONS

WIPO, International Search Report dated Jun. 3, 2018.
(Continued)

*Primary Examiner* — Nishant Divecha
(74) *Attorney, Agent, or Firm* — Li & Cai Intellectual Property (USA) Office

(57) ABSTRACT

Provided are a method for base station handover, a system, and a computer storage medium, the method comprising a first access and mobility management function (AMF) receives handover request information sent by a first base station, the handover request information serving to request handover of a UE from the first base station to a second base station; when the UE does not need to carry out cross-AMF handover, the first AMF sends a handover preparation request to the second base station requesting target resources for the UE; in a cross-AMF handover process, the AMF of the UE changes from a first AMF to a second AMF; when a UE needs to carry out a cross-AMF handover process, the
(Continued)

first AMF sends handover request information to a second AMF, and the second AMF sends a handover preparation request to the second base station requesting target resources for the UE.

18 Claims, 4 Drawing Sheets

(51) Int. Cl.
    *H04W 8/08*     (2009.01)
    *H04W 80/10*     (2009.01)
    *H04W 36/30*     (2009.01)

(58) Field of Classification Search
    CPC . H04W 36/0016; H04W 36/30; H04W 36/08; H04W 36/0072
    See application file for complete search history.

(56) References Cited

U.S. PATENT DOCUMENTS

| | | | |
|---|---|---|---|
| 2018/0227873 A1* | 8/2018 | Vrzic | H04W 76/27 |
| 2019/0150219 A1* | 5/2019 | Wang | H04W 76/30 |
| | | | 370/329 |
| 2020/0120570 A1* | 4/2020 | Youn | H04W 36/0033 |

OTHER PUBLICATIONS

"3GPP TS 23.502 V0.1.1", 3rd Generation Partnership Project; Technical Specification Group Services and System Aspects; Procedures for the 5G System; Stage 2; (Release 15), Jan. 31, 2017, section 4.2.2.2.3.

* cited by examiner

BASE STATION HANDOVER METHOD, SYSTEM, AND COMPUTER STORAGE MEDIUM

CROSS-REFERENCE TO RELATED APPLICATIONS

This application is based on and claims priority to Chinese Patent Application No. 201710067392.7, filed on Feb. 7, 2017, the entire contents of which is hereby incorporated by reference.

FIELD OF THE INVENTION

The present disclosure relates to the field of communication, and in particular, to a base station handover method, system, and storage medium.

BACKGROUND

The 3rd Generation Partnership Project (3GPP) begins to discuss next generation system (NextGen System) from R14. The NextGen System can support three business types, namely Evolved Mobile Broadband (eMBB), Massive Machine Type Communication (mMTC) and ultra reliable Machine Type Communication (uMTC), which have different network characteristics. FIG. 1 shows an architecture of next generation mobile communication network, wherein the functions of the network elements are as follows:

The terminal, i.e., User equipment (UE), accesses to the network and obtains services mainly through the next generation wireless air interface. The UE exchanges information through air interface and base station, and exchanges information through non-access stratum signaling and common control plane function of the core network as well as session control plane function.

The next generation base station (gNB) is also known as the next generation (NG) Radio Access Network (RAN) (i.e., NR base station), which is responsible for air interface resource scheduling and air interface connecting management of the terminal access network.

The session control plane function also known as Session Management Function (SMF) is configured to interact with the terminal, and is mainly responsible for processing establishment, modification and deletion requests of user Packet Data Unit (PDU) session, selecting a User Plane Function (UPF), establishing a user plane connection between the terminal and the UPF, and determining Quality of Service (QoS) parameters of the session by using Policy Control Function (PCF).

Access and Mobility control Function (AMF) also known as Access and Mobility management Function is a common control plane function in the core network. A user has only one AMF, which is responsible for authentication, authorization, and subscription checking of users to ensure that the users are legal. The user mobility management includes location registration and temporary identity assignment. When the user initiates a PDU connection setup request, an appropriate SMF is selected for UE. The Non Access Stratum (NAS) signaling between UE and SMF is forwarded. The Access Stratum (AS) signaling between base station and SMF is forwarded.

UPF provides user plane processing function, including data forwarding and QoS execution. In order to ensure the continuity of business, UPF also provides a user plane anchor when the user moves.

PCF provides the SMF with relevant rules of quality of service (QoS rule) of users.

The Subscription Data management (SDM) stores the user's subscription data.

It should be noted that the interface between two network elements in FIG. 1 (such as N1, N2, N3, etc.) is an interface for communication between two connected network elements.

Similar to the traditional wireless communication system, base station handover may occur as a user moves. FIG. 2 shows a flow of the handover.

Step S201, a process of establishing PDU session (PDU Session), i.e., establishing the PDU session having business between the UE and the network.

Step S202, determining, by base station 1 (RAN1), that base station handover needs to be initiated, and determining a target base station 2 for handover (RAN2) according to a measurement report of UE, wherein base station 1 judges that there is no direct interface between base station 1 and the target base station 2 and initiates a handover request message to AMF, the message carries target base station information and current session information, and the session information including PDU session information and a PDU session identifier.

Step S203, performing handover preparation, initiating a handover request message to the target base station 2, by AMF, according to the target base station information, the message carries current session information, the current session information including PDU session information, PDU session identifier and QoS information (whether to include an upstream tunnel identifier of N3).

Step S204, responding the handover preparation, reserving, by target base station 2, radio resources according to PDU session information, and returning a handover request response message with reserved radio resource information, wherein the message also carries a tunnel downlink tunnel identifier of N3 assigned by the target base station 2 for each PDU session in which resource is successfully reserved.

Step S205, judging, by AMF, whether the resource is successfully reserved for a PDU session, and if yes, then returning handover request response message to base station 1 with the radio resource information reserved by the target base station 2 for the PDU session.

Step S206, initiating, by base station 1, a handover command to UE, with the radio resource information reserved by base station 2.

Step S207, requesting access by a user, and allowing the terminal to access to base station 2 according to the radio resource information reserved by the target base station 2.

Step S208, completing handover, and initiating a completion message to AMF by target base station 2.

Step S209, initiating, by AMF, a PDU session update request to SMF, with the downlink tunnel identifier of N3 assigned for each session by target base station 2.

Step S210, updating the downlink tunnel identifier of N3 interactively by SMF and AMF, and returning a path handover response to AMF, that is, PDU session update response.

Step S211, sending a N2 connection release request to base station 1 (source base station) by AMF.

Step S212, triggering location update procedure under the condition that the base station cell is not in a TA list of UE (TA (Tracking Area) is a concept list newly established by LTE system and location management of UE.)

AMF is a network element responsible for mobility, which does not save session information. Therefore, in step S203, AMF needs to obtain session information of UE. At the same time, AMF is related to the location of UE, and each UE has only one AMF for serving it. As UE moves, it may move out of AMF service area. At this point, it may cause changes in AMF, and the changes in AMF may further result in changes in SMF. Currently, there is no technology as to how to reserve resources on the target side under these circumstances.

In view of the technical problem that the target side cannot reserve resources for user terminal in the related art, an effective solution has not been proposed yet.

SUMMARY

The embodiments of the present disclosure provide a base station handover method, system, and storage medium.

According to one aspect of an embodiment of the present disclosure, there is provided a base station handover method, comprising: receiving, by a first Access and Mobility management Function AMF, handover request information sent from a first base station, wherein the handover request information is used to request a handover of a user equipment from the first base station to a second base station; sending, from the first AMF, a handover preparation request to the second base station requesting target resources for the user equipment under the condition that there is no need for the user equipment to carry out a cross-AMF handover, wherein the handover preparation request carries the handover request information and session information of the user equipment, and during the cross-AMF handover, an AMF of the user equipment changes from the first AMF to a second AMF; and sending, from the first AMF, the handover request information to the second AMF under the condition that there is a need for the user equipment to carry out the cross-AMF handover, and sending, from the second AMF, the handover preparation request to the second base station requesting the target resources for the user equipment.

In the above solution, before the step of sending, from the first AMF, the handover preparation request to the second base station, the method further comprises: obtaining, by the first AMF, the session information of the user equipment from a first Session Management Function SMF.

In the above solution, the step of obtaining, by the first AMF, the session information of the user equipment from the first SMF, comprises: obtaining, by the first AMF, session information of each of sessions from the first SMF corresponding to the session in the case where the user equipment has multiple sessions.

In the above solution, before the step of sending, from the second AMF, the handover preparation request to the second base station, the method further comprises: obtaining, by the second AMF, the session information of the user equipment from the first SMF in the case where a connection with the first SMF is able to be established; and obtaining, by the second AMF, the session information of the user equipment through the second SMF in the case where the connection with the first SMF is not able to be established, wherein the second SMF is a SMF allocated by the second AMF to the user equipment.

In the above solution, the step of obtaining, by the second AMF, the session information of the user equipment through the second SMF, comprises: sending, by the second AMF, the handover preparation request to the second SMF after the second SMF is allocated to the user equipment, to instruct the second SMF to obtain the session information of the user equipment from the first SMF; and receiving, by the second AMF, the session information of the user equipment returned by the second SMF.

In the above solution, the first AMF sends handover request information to the second AMF comprising: the first AMF sends handover request information and the address information of the first SMF to the second AMF.

In the above solution, before the step of sending, from the second AMF, the handover preparation request to the second base station, the method further comprises: judging, by the second AMF, whether there is an address matching the address information of the first SMF in a preset address set, wherein the address in the preset address set is an address allowing for a connection of the second AMF, wherein in the case where there is an address matching the address information of the first SMF in the preset address set, it is determined that the second AMF is able to establish a connection with the first SMF, and in the case where there is no address matching the address information of the first SMF in the preset address set, it is determined that the second AMF is not able to establish a connection with the first SMF.

In the above solution, the method further includes sending by, the first base station, a handover command carrying the indication information of the target resource to user equipment in the case where the first base station receives a response message to the handover request information, wherein the user equipment is switched to the second base station according to an indication of the handover command and the session is carried through the target resource.

In the above solution, the session information comprises QoS information of the session.

According to another aspect of an embodiment of the present disclosure, there is provided a base station handover system, including: a first Access and Mobility management Function AMF, configured to receive handover request information sent from a first base station, wherein the handover request information is used to request a handover of a user equipment from the first base station to a second base station, the first AMF further being configured to send a handover preparation request to the second base station requesting target resources for the user equipment under the condition that there is no need for the user equipment to carry out a cross-AMF handover, wherein the handover preparation request carries the handover request information and session information of the user equipment, and during the cross-AMF handover, the AMF of the user equipment changes from the first AMF to a second AMF; and the second AMF, configured to receive the handover request information sent from the first AMF under the condition that there is a need for the user equipment to carry out the cross-AMF handover, and send a handover preparation request to the second base station requesting the target resources for the user equipment.

In the above solution, the first AMF is further configured to obtain session information of the user equipment from the first Session Management Function SMF.

In the above solution, the first AMF is further configured to obtain the session information of each session from the first SMF corresponding to the session in the case where the user equipment has multiple sessions.

In the above solution, the second AMF comprises: a first obtaining module configured to obtain the session information of the user equipment from the first SMF in the case where a connection with the first SMF is able to be established; and a second obtaining module is configured to obtain the session information of the user equipment through the second SMF in the case where the connection with the first SMF is not able to be established, wherein the second SMF is a SMF allocated by the second AMF to the user equipment.

In the above solution, the second obtaining module comprises: a sending sub-module, configured to send the handover preparation request to the second SMF after the second SMF is allocated to for the user equipment, to instruct the second SMF to obtain the session information of the user equipment from the first SMF; and a receiving sub-module, configured to receive the session information of the user equipment returned by the second SMF.

In the above solution, the first AMF is further configured to send the handover request information and address information of the first SMF to the second AMF.

In the above solution, session information includes the QoS information of the session.

According to another embodiment of the present disclosure, there is provided a base station handover method, including: receiving, by a first Access and Mobility management Function AMF, handover request information sent from a first base station, wherein the handover request information is used to request a handover of a user equipment from the first base station to a second base station; sending, by the first AMF, a handover preparation request to the second base station requesting target resources for the user equipment under the condition that there is no need for the user equipment, wherein the handover preparation request carries the handover request information and session information of the user equipment, and during the cross-AMF handover, an AMF of the user equipment changes from the first AMF to a second AMF; and sending, by the first AMF, the handover request information to the second AMF under the condition that there is a need for the user equipment to carry out the cross-AMF handover, wherein the handover request information is used for the second AMF to send the handover preparation request to the second base station requesting the target resources for the user equipment.

In the above solution, before the step of sending, by the first AMF, the handover preparation request to the second base station, the method further comprises: obtaining, by the first AMF, the session information of the user equipment from a first Session Management Function SMF.

In the above solution, the step of obtaining, by the first AMF, the session information of the user equipment from the first SMF, comprises: obtaining, by the first AMF, session information of each of sessions from the first SMF corresponding to the session in the case where the user equipment has multiple sessions.

In the above solution, the step of sending, from the first AMF, the handover request information to the second AMF, comprises: sending, by the first AMF, the handover request information and address information of the first SMF to the second AMF.

According to another embodiment of the disclosure, there is provided a base station handover method, including: receiving, by a second Access and Mobility management Function AMF, handover request information sent from the first AMF, wherein the received handover request information is sent after the first AMF receives the handover request information sent from the first base station and when the user equipment needs to carry out a cross-AMF handover; the handover request information received by the first AMF is used to request a handover of a user equipment from the first base station to a second base station; during the cross-AMF handover, the AMF of the user equipment changes from the first AMF to a second AMF; and sending a handover preparation request to the second base station requesting target resources for the user equipment.

In the above solution, before the step of sending, from the second AMF, the handover preparation request to the second base station, the method further includes: obtaining, by the second AMF, the session information of the user equipment from a first Session Management Function SMF in the case where a connection with the first SMF is able to be established; and obtaining, by the second AMF, the session information of the user equipment through the second SMF in the case where the connection with the first SMF is not able to be established, wherein the second SMF is a SMF allocated by the second AMF to the user equipment.

In the above solution, the step of obtaining, by the second AMF, the session information of the user equipment through the second SMF, comprises: sending, by the second AMF, a handover preparation request to the second SMF after the second SMF is allocated to the user equipment, to instruct the second SMF to obtain the session information of the user equipment from the first SMF; and receiving, by the second AMF, the session information of the user equipment returned by the second SMF.

In the above solution, when receiving, by the second AMF, the handover request information sent from the first AMF, the method further comprises: receiving, by the second AMF, the address information of the first SMF sent from the first AMF.

According to another embodiment of the disclosure, there is provided a storage medium. The storage medium can be configured to store program code for performing the following steps: receiving handover request information sent from the first AMF, wherein the received handover request information is sent after the first AMF receives the handover request information sent from the first base station and when the user equipment needs to carry out the cross-AMF handover; the handover request information received by the first AMF is used to request the handover of the user equipment from the first base station to a second base station; during the cross-AMF handover, the AMF of the user equipment changes from the first AMF to a second AMF; and sending a handover preparation request to the second base station requesting target resources for the user equipment.

In other words, according to another embodiment of the present disclosure, there is provided a storage medium on which a computer program is stored, and when the computer program is executed by the processor, the steps of any first AMF side method according to the embodiment of the present disclosure are implemented.

According to another embodiment of the present disclosure, there is also provided a storage medium, on which a computer program is stored, and when the computer program is executed by the processor, the steps of any second AMF side method according to the embodiment of the present disclosure are implemented.

In the embodiments of the disclosure, the first AMF receives handover request information sent from a first base station, wherein the handover request information is used to request a handover of a user equipment from the first base station to a second base station; in the case where the user equipment does not need to carry out cross-AMF handover, the first AMF also sends a handover preparation request to the second base station requesting target resources for the user equipment, wherein the handover preparation request carries the handover request information and session information of user equipment, and during the cross-AMF handover, the AMF of the user equipment changes from the first AMF to a second AMF; and in the case where the user equipment needs to carry out the cross-AMF handover process, the second AMF receives the handover request information sent from the first AMF, and the second AMF sends a handover preparation request to the second base station requesting target resources for the user equipment. As such, the target base station side is allowed to reserve the target resource for the user equipment, thereby solving the technical problem that the target side cannot reserve resources for the user terminal in the related art, and realizing the technical effect of reserving the target resource for UE on the target base station side.

BRIEF DESCRIPTION OF THE DRAWINGS

The drawings described herein are intended to provide a further understanding of the disclosure and constitute a part of the disclosure. The schematic embodiments of the present disclosure and the description thereof are for explaining the present disclosure. In the drawings.

DETAILED DESCRIPTION OF THE EMBODIMENTS

The present disclosure will be described in detail below with reference to the drawings in conjunction with the embodiments. It should be noted that, without conflict, the embodiments in the present disclosure and the features in the embodiments can be combined with each other.

It should be noted that the terms "first", "second" and the like in the specification, claims and the drawings of the present disclosure are provided to distinguish similar objects, and are not necessarily used to describe a specific order or priority.

First Embodiment

According to an embodiment of the present disclosure, there is provided a method embodiment of base station handover method. It should be noted that the steps illustrated in the flow charts of the drawings may be performed in a computer system such as a set of computer executable instructions, and although the logical order is shown in the flow charts, in some cases, the steps shown or described may be performed in a different order than the ones described herein.

Figure 1:
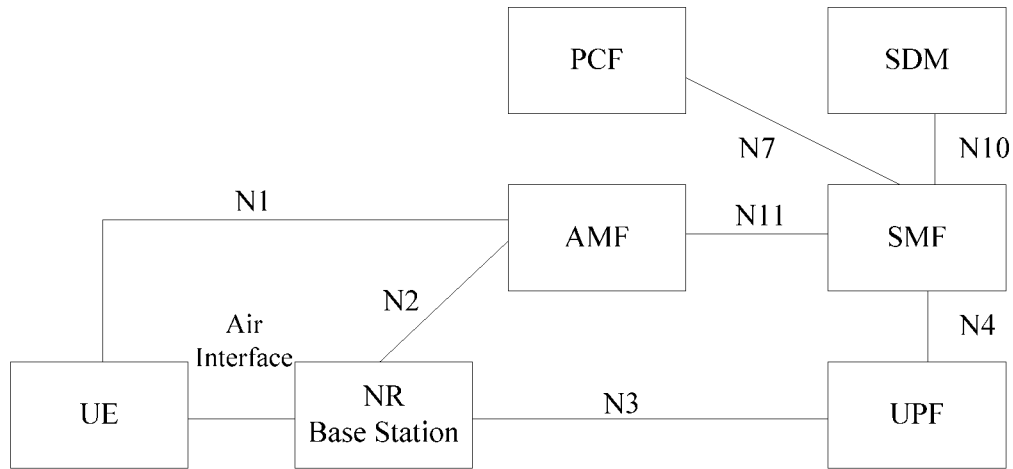
FIG. 1 is a schematic diagram of mobile communication network architecture in the related art.
Figure 2:
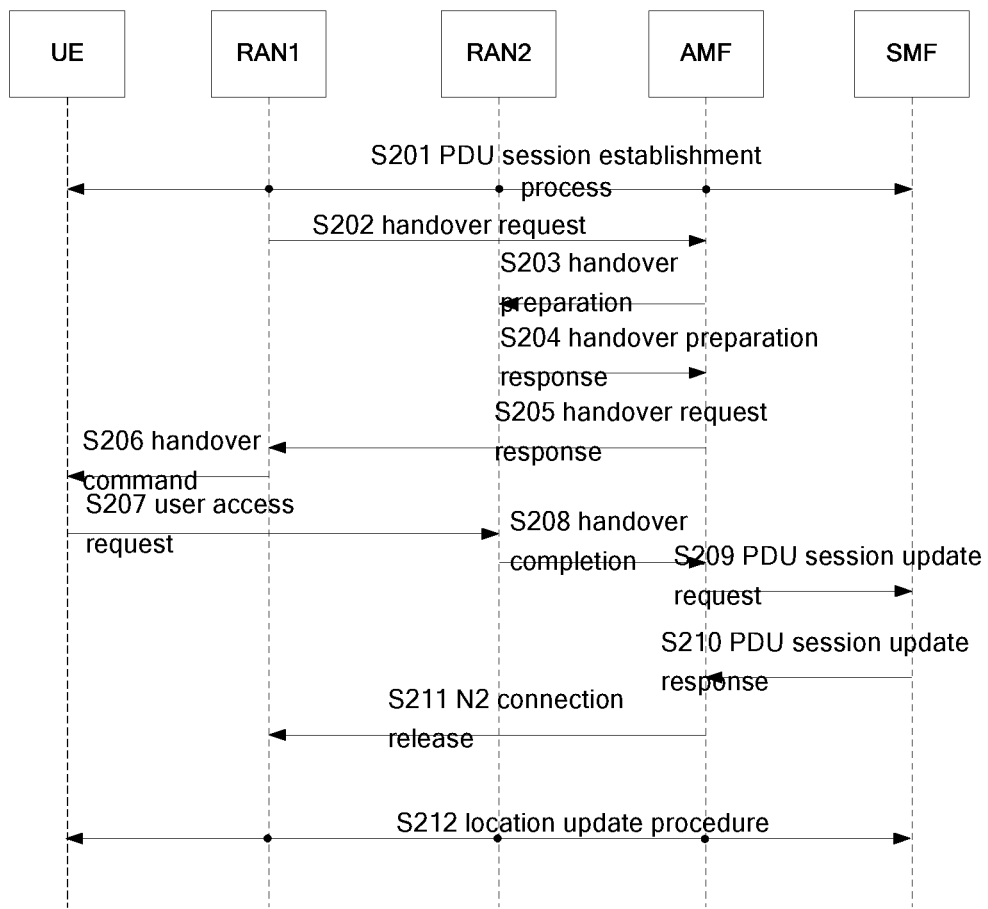
FIG. 2 is a flow chart of base station handover in the related art.
Figure 3:
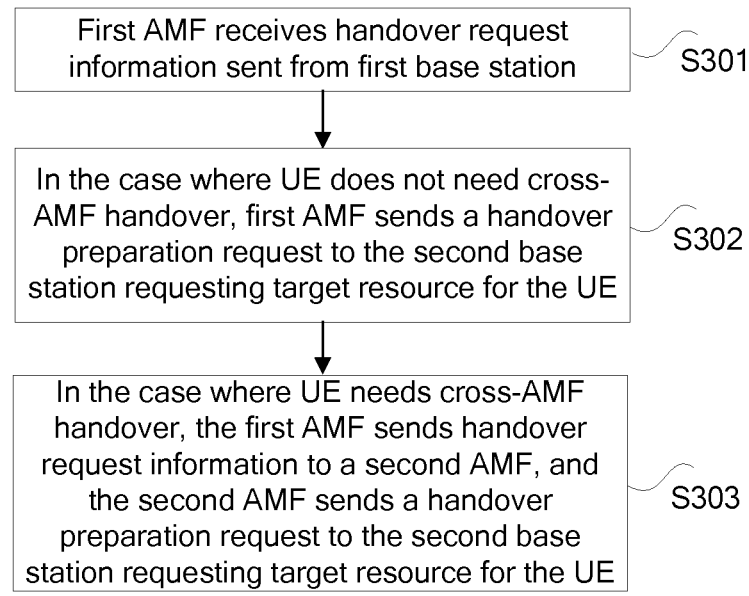
FIG. 3 is a flow chart of an optional base station handover method according to an embodiment of the present disclosure.

FIG. 3 is a flow chart of an optional base station handover method according to an embodiment of the present disclosure. As shown in FIG. 3, the method includes steps of:

Step S301, receiving, by a first AMF, handover request information sent from a first base station, wherein the handover request information is used to request a handover of a user equipment from the first base station to a second base station;

Step S302, sending, from the first AMF, a handover preparation request to the second base station requesting target resources for the user equipment under the condition that there is no need for the user equipment to carry out cross-AMF handover, wherein the handover preparation request carries handover request information and session information of the user equipment, and during the cross-AMF handover, the AMF of the user equipment changes from the first AMF to a second AMF; and Step S303, sending the handover request information to the second AMF from the first AMF under the condition that there is a need for the user equipment to carry out the cross-AMF handover, and sending, from the second AMF, the handover preparation request to the second base station requesting the target resources for the user equipment.

Through the above embodiment, the first AMF receives the handover request information sent from the first base station, the handover request information serving to request the handover of the user equipment from the first base station to the second base station; in the case where the user equipment does not need to carry out the cross-AMF handover, the first AMF sends the handover preparation request to the second base station requesting target resources for the user equipment, wherein the handover preparation request carries the handover request information and the session information of user equipment, and during the cross-AMF handover, the AMF of the user equipment changes from the first AMF to the second AMF; and in the case where the user equipment needs to carry out the cross-AMF handover, the first AMF sends handover request information to the second AMF, and the second AMF sends the handover preparation request to the second base station requesting target resources for the user equipment. As such, the target base station side is allowed to reserve the target resource for the user equipment, thereby solving the technical problem that the target side cannot reserve resources for the user terminal in the related art, and realizing the technical effect of reserving the target resource for UE on the target base station side.

In the above embodiment, before the first AMF sends the handover preparation request to the second base station, the first AMF obtains session information of the user equipment from a first SMF.

In an embodiment, the first AMF obtains session information of UE from the first SMF, including that: in the case where the user equipment has multiple sessions, the first AMF obtains session information of each of sessions from the first SMF corresponding to the session.

In an optional embodiment, before the second AMF sends the handover preparation request to the second base station, in the case where a connection with the first SMF is able to be established, the second AMF obtains the session information of the user equipment from the first SMF; in the case where the connection with the first SMF is not able to be established, the second AMF obtains the session information of the user equipment through the second SMF, wherein the second SMF is a SMF allocated by the second AMF to the user equipment.

In the above embodiment, the second AMF obtains session information of UE through the second SMF, including that: after the second SMF is allocated to the user equipment, the second AMF sends the handover preparation request to the second SMF to instruct the second SMF to obtain the session information of the user equipment from the first SMF; the second AMF receives the session information of the user equipment returned by the second SMF.

It should be noted that, the first AMF sends the handover request information to the second AMF including that: the first AMF sends the handover request information and address information of the first SMF to the second AMF.

Optionally, before the second AMF sends the handover preparation request to the second base station, the second AMF judges whether there is an address matching the address information of the first SMF in a preset address set, wherein the address in the preset address set is an address allowing for a connection of the second AMF; wherein in the case where there is an address matching the address information of the first SMF in the preset address set, it is determined that the second AMF can establish a connection with the first SMF, and in the case where there is no address matching the address information of the first SMF in the preset address set, it is determined that the second AMF cannot establish a connection with the first SMF.

Optionally, in the case where the first base station receives a response message to the handover request information, the first base station sends a handover command carrying the indication information of the target resource to UE, wherein the UE is switched to the second base station according to the indication of the handover command and the session is carried through the target resource.

Through the above embodiment, after the AMF receives the handover request, if there is no cross-AMF handover, the AMF needs to obtain session information from the SMF and then request the resources from the target base station. If the source AMF (i.e., the first AMF) finds that a cross-AMF handover is required, the source AMF sends the address of SMF and the handover request to the target AMF (i.e., the second AMF). After the target AMF receives the handover request (carrying the address of the SMF), if it can connect to the source SMF, the AMF requests the QoS information from the source SMF and requests resource from the target NR base station. Otherwise, the target AMF allocates a new SMF and forwards the request. The target SMF requests the QoS information from the source SMF; and after receiving the information of the source SMF, the target SMF requests the resource from the target base station and returns it to the AMF, thereby solving the technical problem that the target side cannot reserve resources for the user terminal in the related art.

Embodiments of the present disclosure will be described in detail below with reference to the implementations as shown in FIGS. 4 to 7.

Figure 4:
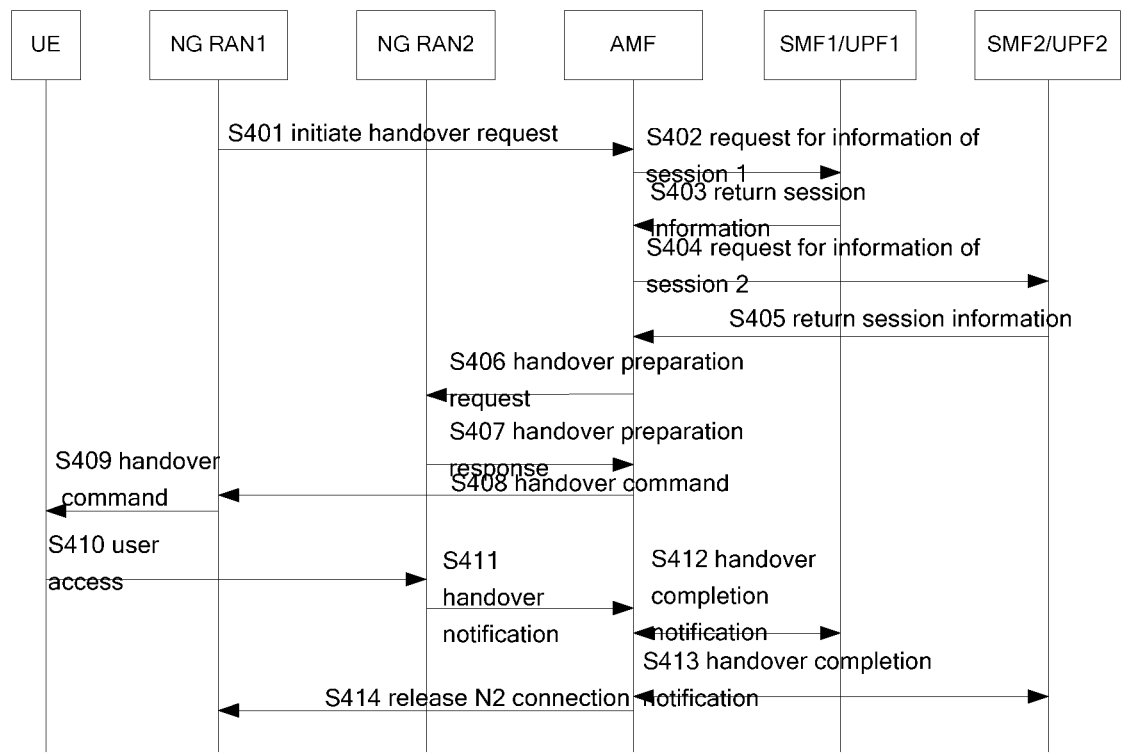
FIG. 4 is a flow chart of an optional base station handover method according to an embodiment of the present disclosure.

FIG. 4 is a flow chart of a cross-base station handover in an embodiment of the present disclosure. In the embodiment, after UE is attached to the NextGen system, the UE establishes two PDU sessions. SMF1/UPF1 serves the first PDU session, and SMF2/PDU2 serves SMF2/PDU2 service.

Herein, the UE is attached to the NextGen system and establishes two PDU session. And each PDU session has uplink/downlink traffic.

As shown in FIG. 4, the cross-base station handover includes:

Step S401, determining, by a base station 1 (RAN1), that a base station handover needs to be initiated, and determining a target base station 2 (NG RAN2) for handover according to a measurement report of UE, wherein base station 1 judges that there is no NX2 interface between base station 1 and target base station 2 and initiates a handover request message to AMF, the message carries target base station information and current session information, the session information including PDU session information.

Step S402, requesting, by AMF, QoS information of PDU session 1 from SMF1/UPF1 according to information of PDU session 1, wherein the QoS information of session 1 includes QoS parameters of session 1 and N3 uplink tunnel information of PDU session 1;

Step S403, returning, by SMF1/UPF1, the session information of session 1;

Step S404, requesting, by AMF, QoS information of PDU session 2 from SMF2/UPF2 according to information of PDU session 2, wherein the QoS information of session 2 includes QoS parameters of session 2 and N3 uplink tunnel information of PDU session 2;

Step S405, returning, by SMF2/UPF2, the session information of session 2;

Step S406, requesting, by AMF, a resource reservation from target base station (base station 2) (i.e. sending a handover preparation request);

Step S407, reserving radio resources, by base station 2, according to the PDU session information, and returning a handover request response message with reserved radio resource information, wherein the message further carries a downlink tunnel identifier of N3 tunnel assigned by the target base station 2 for each PDU session in which the resource is successfully reserved;

Step S408, returning, by AMF, the handover request response message (including a handover command) to base station 1, with the radio resource information reserved by the target base station 2 for the PDU session.

Step S409, initiating, by the base station 1, the handover command to UE, with the radio resource information reserved by base station 2;

Step S410, accessing to the target base station by UE;

Step S411, initiating, by the base station 2, a handover notification message to AMF;

Step S412, initiating, by AMF, a handover notification to SMF1, with the downlink tunnel identifier of N3 tunnel assigned for PDU session 1 by target base station 2, updating the downlink tunnel identifier of N3 tunnel interactively by SMF1 and UPF1, and returning a path handover response to AMF;

Step S413, initiating, by AMF, the handover notification to SMF2, with downlink tunnel identifier of N3 tunnel assigned for PDU session 2 by target RAN2, updating the downlink tunnel identifier of N3 interactively by SMF2 and UPF2, and then returning a path handover response to AMF.

Step S414, sending, by AMF, a N2 connection release request to source base station 1 and releasing N2 interface.

Figure 5:
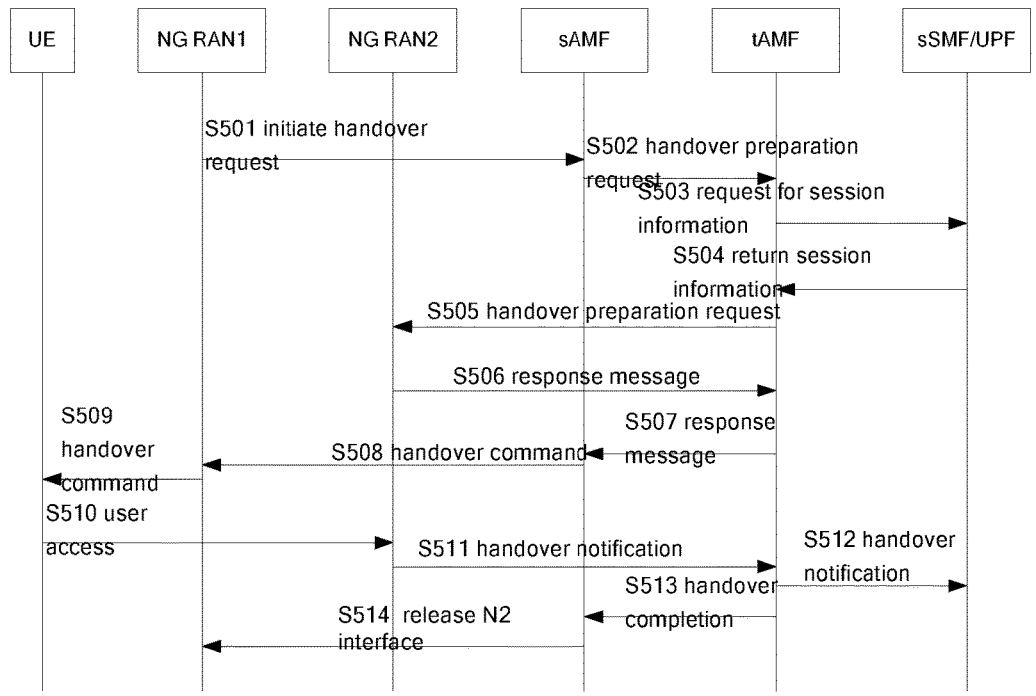
FIG. 5 is a flow chart of an optional base station handover method according to an embodiment of the present disclosure.

FIG. 5 is a flow chart of the cross-AMF handover with the same SMF maintained in an embodiment of the present disclosure.

UE is attached to the NextGen system and establishes a PDU session. And each PDU session has uplink/downlink traffic. When multiple PDU sessions are established, the principle thereof is similar to that of FIG. 4.

The flow of the base station handover method as shown in FIG. 5, includes:

Step S501, determining, by base station 1 (RAN1), that base station handover needs to be initiated, and determining a target base station 2 for handover according to a measurement report of UE, wherein base station 1 judges that there is no NX2 interface between base station 1 and target base station 2 and then initiates a handover request message to sAMF (i.e., a source AMF and a first AMF), the message carries target base station information and current session information, the session information including PDU session information;

Step S502, selecting, by sAMF (i.e., the source AMF), a target tAMF (i.e., the target AMF, which is a second AMF in the embodiment of the present disclosure) according to the target base station information and then initiating a handover preparation request message to the tAMF, the message carries the target base station information and current session information, the current session information including an address of sSMF and PDU session information;

Step S503, sending, by tAMF, PDU session information of a handover request to sSMF according to sSMF information;

Step S504, returning, by sSMF, the PDU session information including QoS information, for example;

Step S505, requesting, by tAMF, a resource reservation from the target base station 2 (NG RAN2) according to the information of session (for example, sending the handover preparation request);

Step S506, reserving radio resources, by the base station 2, according to PDU session information, and returning a handover request response message with reserved radio resource information, wherein the message further carries a downlink tunnel identifier of N3 assigned by the target base station 2 for each PDU session in which the resource is successfully reserved;

Step S507, returning, by tAMF, a handover preparation response message to sAMF, wherein the message carries the radio resource information reserved by the target base station for the PDU session;

Step S508, judging, by sAMF, whether the resource is successfully reserved for a PDU session, and if yes, then returning a handover request response message (carrying a handover command) to base station 1 with the radio resource information reserved by the target base station 2 for the PDU session;

Step S509, initiating, by the base station 1, the handover command to UE, with the radio resource information reserved by the base station 2;

Step S510, accessing the base station 2 by the terminal according to the radio resource information reserved by the base station 2;

Step S511, initiating, by the base station 2, a handover notification message to tAMF;

Step S512, initiating, by tAMF, a handover notification to SMF with the downlink tunnel identifier of N3 tunnel assigned for each session by the target base station 2, updating the downlink tunnel identifier of N3 tunnel interactively by SMF and UPF, and then returning a path handover response to AMF;

Step S513, returning a handover complete message to sAMF by tAMF; and

Step S514, sending a N2 connection release request to the source base station 1 by sAMF.

Figure 6:
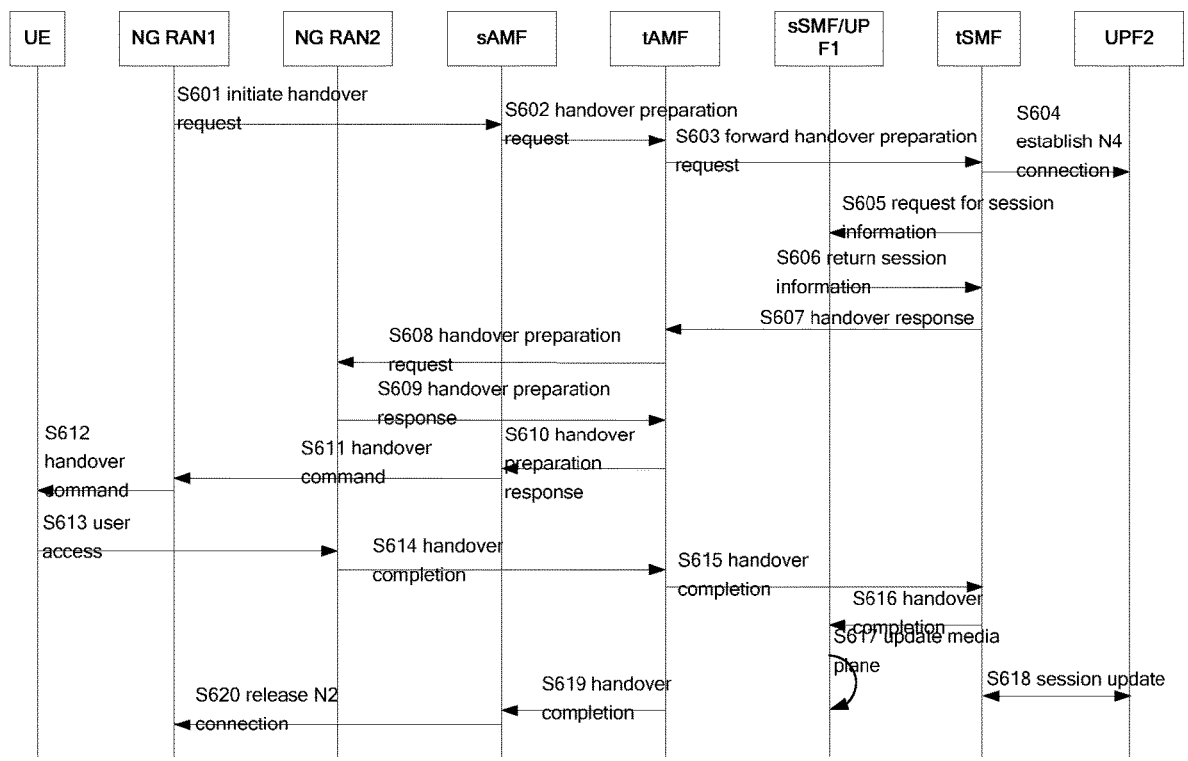
FIG. 6 is a flow chart of an optional base station handover method according to an embodiment of the present disclosure.

FIG. 6 is a flow chart of the cross-AMF handover with SMF changed in an embodiment of the present disclosure.

UE is attached to the NextGen system and establishes a PDU session. And each PDU session has uplink/downlink traffic. When multiple PDU sessions are established, the principle thereof is similar to that of FIG. 4.

The flow of the base station handover method as shown in FIG. 6, includes:

Step S601, determining, by a base station 1 (RAND, that a base station handover needs to be initiated, and determining a target base station 2 (NG RAN2) for handover according to a measurement report of UE, wherein base station 1 judges that there is no NX2 interface between base station 1 and target base station 2 and initiates a handover request message to sAMF (that is the source AMF and the first AMF), and the message carries target base station information and current session information, the session information including PDU session information;

Step S602, selecting, by sAMF (i.e., a source AMF), a target tAMF (i.e., a target AMF, which is a first AMF in the embodiment of the present disclosure) according to the target base station information and then initiating a handover preparation request message to the tAMF, wherein the message carries the target base station information and current session information, the current session information including an address of sSMF and PDU session information;

Step S603, in the case where tAMF detects that sSMF is out of connection, assigning a new tSMF to PDU session and forwarding a handover preparation request to tSMF;

Step S604, selecting UPF2 and establishing a N4 interface by tSMF, wherein UPF2 allocates a downlink N9 tunnel identifier, and returns an uplink N3 tunnel identifier to tSMF;

Step S605, requesting, by tSMF, PDU session information from the sSMF according to sSMF information, and carrying the downlink N9 tunnel identifier;

Step S606, returning, by sSMF, QoS information of the PDU session and N9 uplink tunnel identifier;

Step S607, returning, by tSMF, a handover response to tAMF, including the QoS information of PDU session;

Step S608, requesting, by tAMF, a resource reservation from the target base station 2 (i.e., sending a handover preparation request);

Step S609, reserving radio resources, by the base station 2, according to the PDU session information, and returning a handover request response message with reserved radio resource information, wherein the message further carries a downlink tunnel identifier N3 tunnel assigned by the target base station 2 for each PDU session in which the resource is successfully reserved;

Step S610, returning, by tAMF, a handover preparation response message to sAMF, wherein the message carries the radio resource information reserved by the target base station 2 for PDU session;

Step S611, judging, by sAMF, whether the resource is successfully reserved for the PDU session, and if yes, returning a handover request response message (carrying a handover command) to the base station 1 with the radio resource information reserved by the target base station 2 for the PDU session;

Step S612, initiating a handover command to UE by base station 1, with the radio resource information reserved by the base station 2;

Step S613, accessing the base station 2 by UE according to the radio resource information reserved by the base station 2;

Step S614, initiating, by the base station 2, a handover notification message to tAMF and prompting that the handover is completed;

Step S615, initiating, by tAMF, a handover notification to sSMF 1 with a downlink tunnel identifier of N3 tunnel assigned by target base station 2 for each PDU session, and prompting that the handover is completed;

Step S616, sending, by tSMF, handover completion to sSMF, and prompting that the handover is completed;

Step S617, updating, by sSMF, a controlled UPF user plane, and forwarding to UPF2 with downlink data;

Step S618, updating the session, and updating the downlink tunnel identifier N3 tunnel and uplink tunnel identifier of N9 interactively by tSMF and UPF2;

The above steps S616 and 618 may be performed in parallel.

Step S619, returning, by tAMF, a handover completion message to sAMF, and prompting that the handover is completed; and Step S620, sending, by sAMF, a N2 connection release request to the source base station 1.

Figure 7:
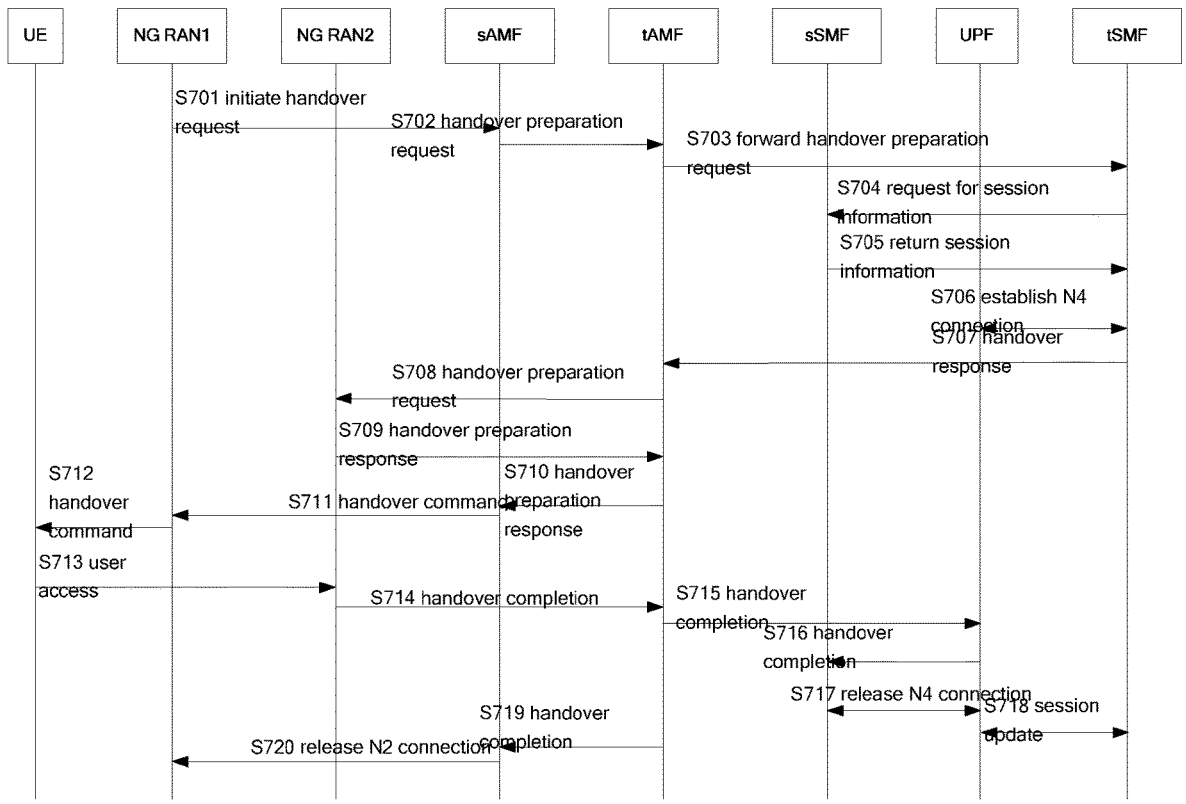
FIG. 7 is a flow chart of an optional base station handover method according to an embodiment of the present disclosure.

FIG. 7 is a flow chart of the cross-AMF handover, with SMF changed but UPF unchanged in an embodiment of the present disclosure. Most of the steps in this embodiment are the same as those in FIG. 6. Only different steps will be described herein.

UE is attached to the NextGen system and establishes a PDU session. And each PDU session has uplink/downlink traffic.

Steps S701 to S703 are the same as Steps S601 to S603.

Step S704, in the case where tSMF detects that UPF can be controlled, not allocating new UPF any more, and requesting, by tSMF, session information from sSMF;

Step S705, returning, by sSMF, QoS information (i.e., session information) of PDU session, which includes UPF information;

Step S706, establishing a N4 interface by tSMF and UPF, allocating, by UPF2, a downlink tunnel identifier of N9 and an uplink tunnel identifier of N3, and returning the same to tSMF;

Steps S707 to S715 are the same as Steps S607 to S615.

Step S716, sending, by tSMF, handover completion information to sSMF.

Step S717, allowing sSMF to release the N4 interface between sSMF and UPF;

Step S718, updating session, and updating the downlink tunnel identifier of N3 tunnel interactively by tSMF and UPF;

The above Steps S716 and S718 may be performed in parallel.

Steps S719 and S720 are the same as Steps S619 and S620.

After Step S706, UPF may be allowed to release N4 interface between UPF and sSMF on its own initiative.

Through the above embodiment, AMF can obtain the required session information, AMF is related to the location of UE, and each UE has only one AMF for serving it. As UE moves, it may move out of AMF service area. At this point, it may cause changes in AMF, and the changes in AMF may further result in changes in SMF. In these cases, the disclosure may also realize the reserve resources on a target side.

Through the description of the above embodiments, those skilled in the art can clearly understand that the method according to the above embodiments can be implemented by means of software plus a necessary general hardware platform, and of course, by hardware, but in many cases, the former is a better implementation. Based on such understanding, the essence the technical solutions of the present disclosure or portions thereof that contribute to the prior art may be embodied in the form of a software product stored in a storage medium (e.g., ROM/RAM, magnet disk, optical disk), comprising a number of instructions for causing a terminal device (which may be a mobile phone, a computer, a server, or a network device, etc.) to perform the methods described in various embodiments of the present disclosure.

Second Embodiment

There is also provided a base station handover system in the embodiment of the present disclosure. The system is configured to implement the above embodiments and specific implementation modes. The parts which have been described will be omitted herein. The term "module" as used below can implement a combination of software and/or hardware for a predetermined function. Although the device described in the following embodiments is preferably implemented in form of software, but hardware or a combination of software and hardware is also possible and conceived.

Figure 8:
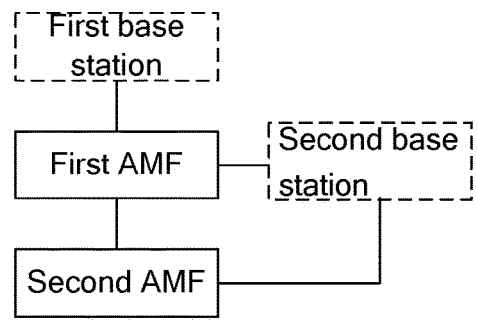
FIG. 8 is a schematic diagram of base station handover system according to an embodiment of the present disclosure.

The base station handover method according to an embodiment of the present disclosure can operate on network architecture as shown in FIG. 8. FIG. 8 is a schematic diagram of a base station handover system according to an embodiment of the present disclosure. As shown in FIG. 8, the system includes: a first AMF and a second AMF.

The first AMF is configured to receive handover request information sent from a first base station, wherein the handover request information is used to request a handover of a user equipment from the first base station to a second base station.

The first AMF is further configured to send a handover preparation request to the second base station requesting target resources for the user equipment under the condition that there is no need for the user equipment to carry out cross-AMF handover, wherein the handover preparation request carries handover request information and session information of the user equipment, and during the cross-AMF handover, the AMF of the user equipment changes from the first AMF to the second AMF.

The second AMF is configured to receive the handover request information sent from the first AMF under the condition that there is a need for the user equipment to carry out the cross-AMF handover, and send a handover preparation request to the second base station requesting the target resources for the user equipment.

Through the above embodiment, the first AMF receives the handover request information sent from the first base station, wherein the handover request information is used to request a handover of a user equipment from the first base station to the second base station; in the case where the user equipment does not need to carry out the cross-AMF handover, the first AMF also sends a handover preparation request to the second base station requesting target resources for the user equipment, wherein the handover preparation request carries the handover request information and session information of user equipment, and during the cross-AMF handover, the AMF of the user equipment changes from the first AMF to a second AMF; and in the case where the user equipment needs to carry out the cross-AMF handover, the second AMF receives the handover request information sent from the first AMF, and the second AMF sends a handover preparation request to the second base station requesting target resources for the user equipment. As such, the target base station side is allowed to reserve the target resource for the user equipment, thereby solving the technical problem that the target side cannot reserve resources for the user terminal in the related art, and realizing the technical effect of reserving the target resource for UE on the target base station side.

In the above embodiment, the first AMF is further configured to obtain session information of the user equipment from the first Session Management Function (first SMF) module.

Optionally, the first AMF is further configured to obtain the session information of each session from the first SMF corresponding to the session when the user equipment has multiple sessions.

In an optional embodiment, the second AMF includes a first obtaining module configured to obtain the session information of the user equipment from the first SMF in the case where a connection with the first SMF is able to be established; and a second obtaining module is configured to obtain the session information of the user equipment through the second SMF in the case where the connection with the first SMF is not able to be established, wherein the second SMF is a SMF allocated by the second AMF to the user equipment.

The second obtaining module includes: a sending sub-module, configured to send the handover preparation request to the second SMF after the second SMF is allocated to for the user equipment, to instruct the second SMF to obtain the session information of the user equipment from the first SMF; and a receiving sub-module, configured to receive the session information of the user equipment returned by the second SMF.

In another optional embodiment, the first AMF is further configured to send the handover request information and address information of the first SMF to the second AMF.

Through the above embodiment, after the AMF receives the handover request, if there is no cross-AMF handover, the AMF needs to obtain session information from the SMF and then request the resources from the target base station. If the source AMF (i.e., the first AMF) finds that a cross-AMF handover is required, the source AMF sends the address of SMF and the handover request to the target AMF (i.e., the second AMF). After the target AMF receives the handover request (carrying the address of the SMF), if it can connect to the source SMF, the AMF requests the QoS information from the source SMF, and requests resource from the target NR base station. Otherwise, the target AMF allocates a new SMF and forwards the request. The target SMF requests the QoS information from the source SMF; and after receiving the information of the source SMF, the target SMF requests the resource from the target base station and returns it to the AMF, thereby solving the technical problem that the target side cannot reserve resources for the user terminal in the related art.

It should be noted that the above modules may be implemented by software or hardware. For the hardware, it may be implemented by, but not limited to a manner in which the above modules are all located in the same processor; alternatively, the above modules are located in different processors in any combination.

Third Embodiment

There is also provided a storage medium in an embodiment of the present disclosure. Optionally, in the embodiment, the storage medium can be configured to store program code for performing the following steps:

S1, receiving handover request information sent from a first base station, wherein the handover request information is used to request a handover of a user equipment from the first base station to a second base station;

S2, sending a handover preparation request to the second base station requesting target resources for the user equipment under the condition that there is no need for the user equipment, wherein the handover preparation request carries handover request information and session information of the user equipment, and during the cross-AMF handover, an AMF of the user equipment changes from the first AMF to a second AMY; and S3, sending handover request information to the second AMF under the condition that there is a need for the user equipment to carry out the cross-AMF handover, and sending, from the second AMF, the handover preparation request to the second base station requesting the target resources for the user equipment.

Optionally, in the embodiment, the storage medium may include, but is not limited to, a variety of medium that can store program code, such as a U flash drive, a Read-Only Memory (ROM), a Random Access Memory (RAM), a hard disk, a magnetic disk, or an optical disk.

Optionally, in the embodiment, the processor executes the following operations according to the stored program code in the computer storage medium: receiving handover request information sent from a first base station, wherein the handover request information is used to request a handover of a user equipment from the first base station to a second base station; sending a handover preparation request to the second base station requesting target resources for the user equipment under the condition that there is no need for the user equipment, wherein the handover preparation request carries handover request information and session information of the user equipment, during the cross-AMF handover, the AMF of the user equipment changes from the first AMF to a second AMF; and sending handover request information to the second AMF under the condition that there is a need for the user equipment to carry out the cross-AMF handover and sending, from the second AMF, a handover preparation request to the second base station requesting the target resources for the user equipment.

In other words, there is provided a storage medium in an embodiment of the present disclosure, on which a computer program is stored, and when the computer program is executed by the processor, the steps of the first AMF side method according to the embodiment of the present disclosure are implemented.

Accordingly, there is also provided a storage medium in an embodiment of the present disclosure, on which a computer program is stored, and when the computer program is executed by the processor, the steps of the second AMF side method according to the embodiment of the present disclosure are implemented.

Specifically, there is provided a storage medium in an embodiment of the present disclosure. The storage medium can be configured to store program code for performing the following steps:

receiving handover request information sent from the first AMF, wherein the received handover request information is sent after the first AMF receives the handover request information sent from the first base station and when the user equipment needs to carry out the cross-AMF handover; the handover request information received by the first AMF is used to request the handover of the user equipment from the first base station to a second base station; during the cross-AMF handover, the AMF of the user equipment changes from the first AMF to a second AMF; and sending a handover preparation request to the second base station requesting target resources for the user equipment.

Optionally, for specific examples in this embodiment, reference may be made to the examples described in the embodiments and optional implementation as set forth above, and details thereof will not be described herein in this embodiment.

Obviously, those skilled in the art should understand that the above modules or steps of the present disclosure can be implemented by a general computing device, which can be integrated on a single computing device or distributed among multiple computing devices. Optionally, they may be implemented by program code executable by the computing device such that they may be stored in the storage device by the computing device. In some cases, the steps shown or described may be performed in a different sequence as stated herein, or they may be separately fabricated into individual integrated circuit modules, or a plurality of modules or steps thereof are fabricated into a single integrated circuit module. Thus, the disclosure is not limited to any particular combination of hardware and software.

The above description is only the preferred embodiments of the present disclosure, and is not intended to limit the present disclosure. For those skilled in related art, various changes and modifications may be made to the present disclosure. Any modifications, equivalent substitutions and improvements. made within the spirit and principles of this disclosure are intended to fall within the scope of the present disclosure.

INDUSTRIAL APPLICABILITY

In the solution according to the embodiments of the present disclosure, the first AMF receives handover request information sent from a first base station, wherein the handover request information is used to request a handover of a user equipment from the first base station to a second base station; in the case where the user equipment does not need to carry out cross-AMF handover, the first AMF also sends a handover preparation request to the second base station requesting target resources for the user equipment, wherein the handover preparation request carries the handover request information and session information of user equipment, and during the cross-AMF handover, the AMF of the user equipment changes from the first AMF to a second AMF; and in the case where the user equipment needs to carry out the cross-AMF handover process, the second AMF receives the handover request information sent from the first AMF, and the second AMF sends a handover preparation request to the second base station requesting target resources for the user equipment. As such, the target base station side is allowed to reserve the target resource for the user equipment, thereby solving the technical problem that the target side cannot reserve resources for the user terminal in the related art, and realizing the technical effect of reserving the target resource for UE on the target base station side.

The invention claimed is:

1. A base station handover method, comprising:
receiving, by a first Access and Mobility management Function (AMF), handover request information sent from a first base station, wherein the handover request information is used to request a handover of a user equipment from the first base station to a second base station;
sending, from the first AMF, a handover preparation request to the second base station requesting target resources for the user equipment under the condition that there is no need for the user equipment to carry out a cross-AMF handover, wherein the handover preparation request carries the handover request information and session information of the user equipment, and during the cross-AMF handover, an AMF of the user equipment changes from the first AMF to a second AMF; and
sending, from the first AMF, the handover request information to the second AMF under the condition that there is a need for the user equipment to carry out the cross-AMF handover, and sending, from the second AMF, the handover preparation request to the second base station requesting the target resources for the user equipment;
wherein before the step of sending, from the second AMF, the handover preparation request to the second base station, the method further comprises:
obtaining, by the second AMF, the session information of the user equipment through a second Session Management Function (SMF) in the case where the connection between the second AMF and a first SMF is not able to be established, wherein the second SMF is a SMF allocated by the second AMF to the user equipment;
wherein the step of obtaining, by the second AMF, the session information of the user equipment through the second SMF, comprises:
sending, by the second AMF, the handover preparation request to the second SMF after the second SMF is allocated to the user equipment, to instruct the second SMF to obtain the session information of the user equipment from the first SMF; and
receiving, by the second AMF, the session information of the user equipment returned by the second SMF.

2. The method according to claim 1, wherein, before the step of sending, from the first AMF, the handover preparation request to the second base station, the method further comprises: obtaining, by the first AMF, the session information of the user equipment from a first SMF.

3. The method according to claim 2, wherein the step of obtaining, by the first AMF, the session information of the user equipment from the first SMF, comprises: obtaining, by the first AMF, session information of each of sessions from the first SMF corresponding to the session in the case where the user equipment has multiple sessions.

4. The method according to claim 1, wherein before the step of sending, from the second AMF, the handover preparation request to the second base station, the method further comprises: obtaining, by the second AMF, the session information of the user equipment from the first SMF in the case where a connection with the first SMF is able to be established.

5. The method according to claim 1, wherein the step of sending, from the first AMF, the handover request information to the second AMF, comprises: sending, by the first AMF, the handover request information and address information of the first SMF to the second AMF.

6. The method according to claim 5, wherein before the step of sending, from the second AMF, the handover preparation request to the second base station, the method further comprises: judging, by the second AMF, whether there is an address matching the address information of the first SMF in a preset address set, wherein the address in the preset address set is an address allowing for a connection of the second AMF, wherein in the case where there is an address matching the address information of the first SMF in the preset address set, it is determined that the second AMF is able to establish a connection with the first SMF, and in the case where there is no address matching the address information of the first SMF in the preset address set, it is determined that the second AMF is not able to establish a connection with the first SMF.

7. The method according to claim 1, further comprising: sending, by the first base station, a handover command carrying the indication information of the target resource to user equipment in the case where the first base station receives a response message to the handover request information, wherein the user equipment is switched to the second base station according to an indication of the handover command and the session is carried through the target resource.

8. The method according to claim 1, wherein the session information comprises quality of service QoS information of the session.

9. A device, applied to a base station handover system, comprising:
a processor; and
a memory for storing instructions executable by the processor;
wherein the processor is configured to:
receive handover request information sent from a first base station, wherein the handover request information is used to request a handover of a user equipment from the first base station to a second base station,
send a handover preparation request to the second base station requesting target resources for the user equipment under the condition that there is no need for the user equipment to carry out a cross-Access and Mobility Function (AMF) handover, wherein the handover preparation request carries the handover request information and session information of the user equipment, and during the cross-AMF handover, the AMF of the user equipment changes from the first AMF to a second AMF; and
receive the handover request information sent from the first AMF under the condition that there is a need for the user equipment to carry out the cross-AMF handover, and send a handover preparation request to the second base station requesting the target resources for the user equipment; wherein the processor is further configured to:
obtain the session information of the user equipment through a second Session Management Function (SMF) in the case where the connection between the second AMF and a first SMF is not able to be established, wherein the second SMF is a SMF allocated by the second AMF to the user equipment;
wherein processor is further configured to:
send the handover preparation request to the second SMF after the second SMF is allocated to for the user equipment, to instruct the second SMF to obtain the session information of the user equipment from the first SMF; and
receive the session information of the user equipment returned by the second SMF.

10. The device according to claim 9, wherein the processor is further configured to obtain session information of the user equipment from the first SMF.

11. The device according to claim 10, wherein the processor is further configured to obtain the session information of each session from the first SMF corresponding to the session in the case where the user equipment has multiple sessions.

12. The device according to claim 9, wherein the processor is further configured to: obtain the session information of the user equipment from the first SMF in the case where a connection with the first SMF is able to be established.

13. The device according to claim 9, wherein processor is further configured to send the handover request information and address information of the first SMF to the second AMF.

14. The device according to claim 9, wherein the session information comprises quality of service QoS information of the session.

15. A base station handover method, comprising:
receiving, by a second Access and Mobility management Function (AMF), handover request information sent from the first AMF, wherein the received handover request information is sent after the first AMF receives the handover request information sent from the first base station and when the user equipment needs to carry out a cross-AMF handover, wherein the handover request information received by the first AMF is used to request a handover of a user equipment from the first base station to a second base station;
during the cross-AMF handover, the AMF of the user equipment changes from the first AMF to a second AMF; and
sending a handover preparation request to the second base station requesting target resources for the user equipment;
wherein before the step of sending, from the second AMF, the handover preparation request to the second base station, the method further comprises: obtaining, by the second AMF, the session information of the user equipment through a second Session Management Function (SMF) in the case where the connection between the second AMF and a first SMF is not able to be established, wherein the second SMF is a SMF allocated by the second AMF to the user equipment;
wherein the step of obtaining, by the second AMF, the session information of the user equipment through the second SMF, comprises:
sending, by the second AMF, a handover preparation request to the second SMF after the second SMF is allocated to the user equipment, to instruct the second SMF to obtain the session information of the user equipment from the first SMF; and
receiving, by the second AMF, the session information of the user equipment returned by the second SMF.

16. The method according to claim 15, wherein before the step of sending, from the second AMF, the handover preparation request to the second base station, the method further comprises: obtaining, by the second AMF, the session information of the user equipment from a first SMF in the case where a connection with the first SMF is able to be established.

17. The method according to claim 15, wherein when receiving, by the second AMF, the handover request information sent from the first AMF, the method further comprises: receiving, by the second AMF, the address information of the first SMF sent from the first AMF.

18. A non-transitory computer readable storage medium, storing a computer program, wherein when the computer program is executed, the steps of the methods according to claim 15 are implemented.

* * * * *